United States Patent
Hochenauer et al.

(10) Patent No.: US 6,810,295 B1
(45) Date of Patent: Oct. 26, 2004

(54) METHOD AND APPARATUS FOR SIMPLIFIED GENERATION AND DISPLAYING OF CUTOUT FEATURES OF COMPUTER AIDED DESIGN (CAD) MODEL

(75) Inventors: Gerald Hochenauer, San Diego, CA (US); Phillip J. Scott, San Diego, CA (US)

(73) Assignee: Autodesk, Inc., San Rafael, CA (US)

( * ) Notice: Subject to any disclaimer, the term of this patent is extended or adjusted under 35 U.S.C. 154(b) by 140 days.

(21) Appl. No.: 09/895,856

(22) Filed: Jun. 29, 2001

(51) Int. Cl.[7] .............................................. G06F 19/00
(52) U.S. Cl. .......................... 700/98; 700/182; 345/964
(58) Field of Search .......................... 700/98, 97, 182; 345/964, 419–420

(56) References Cited

U.S. PATENT DOCUMENTS

| | | | |
|---|---|---|---|
| 4,912,644 A | 3/1990 | Aoyama et al. | |
| 5,255,352 A | 10/1993 | Falk | |
| 5,587,914 A | * 12/1996 | Conradson et al. | ............ 700/95 |
| 5,689,435 A | * 11/1997 | Umney et al. | .................. 703/1 |
| 5,969,973 A | 10/1999 | Bourne et al. | |
| 6,128,020 A | 10/2000 | Arimatsu et al. | |
| 6,327,514 B1 | 12/2001 | Hazama et al. | |
| 6,337,685 B2 | 1/2002 | Nagakura | |
| 6,542,937 B1 | * 4/2003 | Kask et al. | .................. 700/182 |

* cited by examiner

*Primary Examiner*—Leo Picard
*Assistant Examiner*—Zoila Cabrera
(74) *Attorney, Agent, or Firm*—Fish & Richardson P.C.

(57) ABSTRACT

The invention includes computer instructions that operate to receive a selection of a face of a first three-dimensional solid geometry piece, where the first three-dimensional solid geometry piece has a bend area. The instructions operate to receive a depiction of a two-dimensional geometry piece on the face for specifying a cutout feature cutting through the first three-dimensional solid geometry piece. Then, the instructions operate to determine whether the cutout feature, as specified through the depiction of the two-dimensional geometry piece, cuts through the bend area. If cutout feature cuts through the bend area, the instructions operate to automatically generate a number of temporary geometry pieces representative of a three-dimensional geometry piece corresponding to the cutout feature cutting through the bend area in the first three-dimensional solid geometry piece. As a result, cutout features through varying surface areas may be simply generated and visualized.

21 Claims, 12 Drawing Sheets

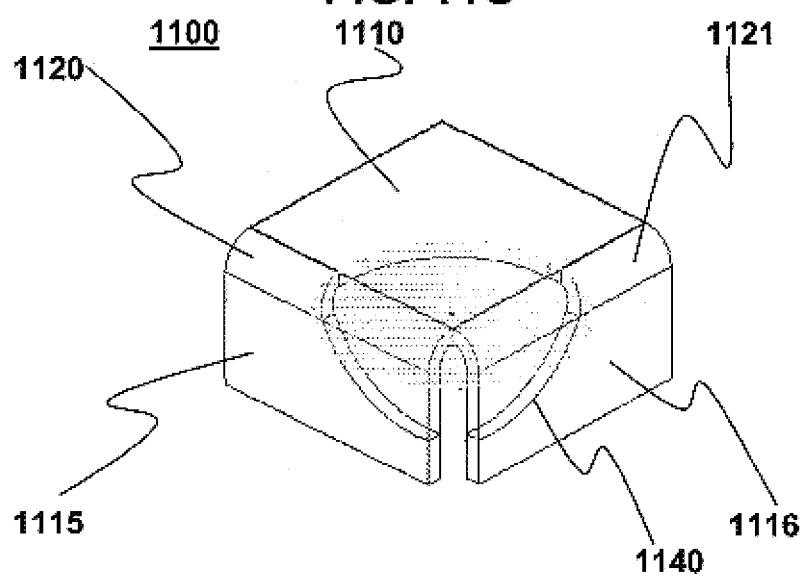
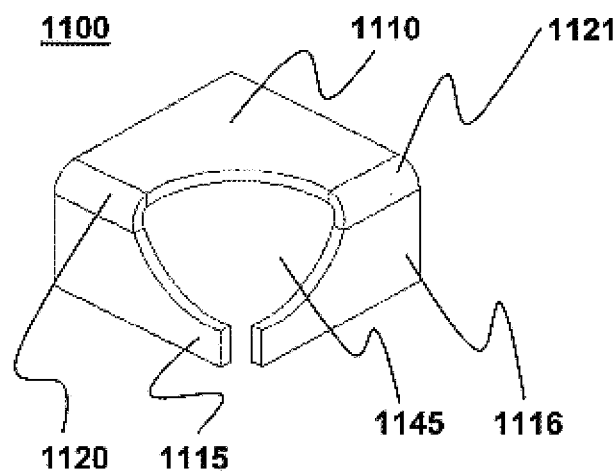
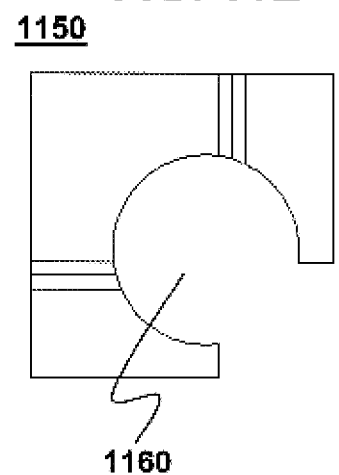

METHOD AND APPARATUS FOR SIMPLIFIED GENERATION AND DISPLAYING OF CUTOUT FEATURES OF COMPUTER AIDED DESIGN (CAD) MODEL

FIELD OF INVENTION

The invention relates to the field of computer aided design (CAD). More specifically, the invention relates to generating and displaying cutout features in a three-dimensional solid geometry piece.

BACKGROUND OF THE INVENTION

Computer aided design (CAD) programs have allowed users to design various parts in "virtual" space before the parts ever reach a manufacturing stage. As CAD programs have become more powerful, parts modeled in "virtual" space (i.e., CAD models) have become more true to life. Often times, these CAD models are also referred to as three-dimensional (3-D) solid models or as solid models because of the fact that they are 3-D geometry pieces with solid properties, such as volume, faces that define the boundary of the three-dimensional solid geometry piece, weight, and so forth. Because the 3-D solid geometry pieces have solid properties, solid operations, such as cutting holes, joining other models, and so forth, are performed on these models. For example, a user may design a 3-D solid geometry piece of a plate, and often times, the plate may have varying surface areas, such as one or more bend areas. Additionally, the user may desire a cutout feature in the plate, and the cutout feature may cut through the one or more bend areas increasing the complexity of the design.

In order to generate a cutout feature in a 3-D solid geometry piece, such as a plate, under the prior art, the user sketches a two-dimensional (2-D) geometry piece of the shape of the cutout feature. A solid operation is performed on the 2-D geometry piece to form a 3-D solid geometry piece of the cutout feature. If the cutout feature cuts through a flat area of the plate, a subtraction operation is performed between the 3-D solid geometry piece of the cutout feature and the plate, thereby generating a cutout hole through the plate. However, if the cutout feature is through a bend area of the plate, in order to form the 3-D solid geometry piece of the cutout feature through the bend area, the user may be required to perform a series of complex operations.

One series of complex operations may involve flattening the plate to remove the bend area, forming a 3-D solid geometry piece of the cutout feature, performing the subtraction operation, as described above, and then, bending the plate back to it original shape with the bend area. Only at this time, will the user be able to visualize the cutout hole through the bend area.

Another series of complex operations may involve forming a 3-D solid geometry piece of the cutout feature, bending the 3-D solid geometry piece of the cutout feature, and then, performing the subtraction operation, as described above, between the plate and the 3-D solid geometry piece of the cutout feature. Again, once the subtraction operation is performed, the user can visualize the cutout hole through the bend area. Bending the 3-D solid geometry piece of the cutout feature to match the bend areas of the plate may be difficult.

After multiple operations to at least visualize the cutout hole, if the user is not satisfied with the cutout hole, the user is required to perform undo operations on the series of operations performed to get back to the original 3-D solid geometry piece of the plate without the cutout hole. The series of undo operations may involve extensive calculations for the CAD program. Additionally, forming a 3-D solid geometry piece of the cutout feature causes extensive calculations for the CAD program, and file sizes of data associated with 3-D solid geometry piece are large.

BRIEF DESCRIPTION OF DRAWINGS

The invention is illustrated by way of example and not by way of limitation in the figures of the accompanying drawings, in which the like references indicate similar elements and in which:

FIGS. 11A–11E illustrate an alternate 3-D solid geometry piece upon which one embodiment of the present invention may be practiced;

DETAILED DESCRIPTION OF THE INVENTION

In the following description, various aspects of the invention will be described. However, it will be apparent to those skilled in the art that the invention may be practiced with only some or all described aspects. For purposes of explanation, specific numbers, materials and configurations are set forth in order to provide a thorough. understanding of the invention. However, it will also be apparent to one skilled in the art that the invention may be practiced without the specific details. In other instances, well-known features are omitted or simplified in order not to obscure the invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computer system includes general purpose as well as special purpose data processing machines, systems, and the like, that are standalone, adjunct or embedded.

Various operations will be described as multiple discrete steps in turn, in a manner that is most helpful in understanding the invention. However, the order of description should not be construed as to imply that these operations are necessarily order dependent. In particular, these operations need not be performed in the order of presentation.

In various embodiments of the invention, an improved way of generating and visualizing cutout features of a computer aided design (CAD) three-dimensional (3-D) solid geometry piece with varying surface areas is facilitated. This and other advantages will be evident from the disclosure.

Figure 1:
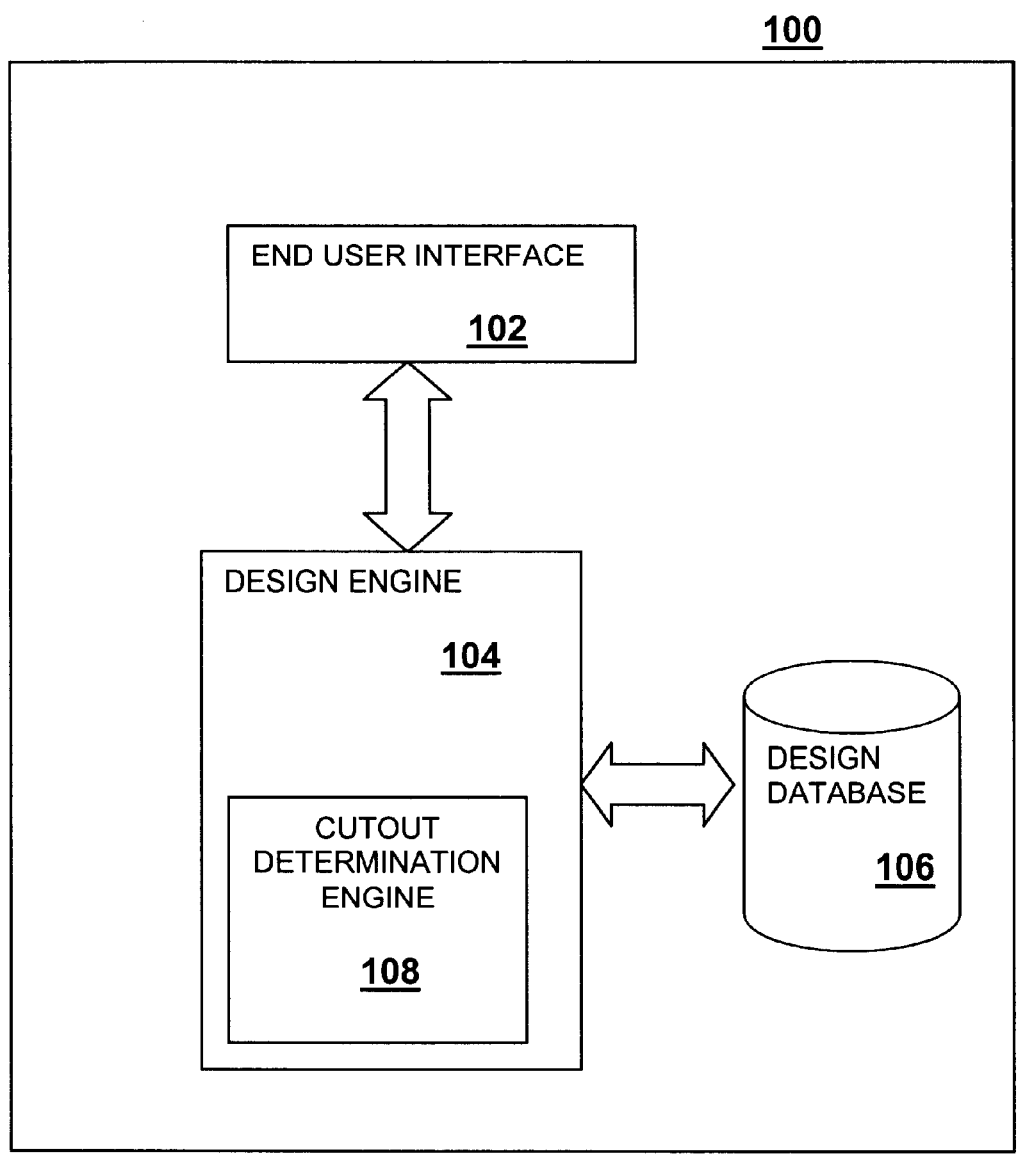
FIG. 1 illustrates a block diagram of one embodiment of a mechanical design application for facilitating generating and displaying cutout features of a 3-D solid geometry piece, in accordance with the present invention.

FIG. 1 illustrates a block diagram of one embodiment of a mechanical design application for facilitating generating and displaying cutout features of a 3-D solid geometry piece, in accordance with the present invention. In FIG. 1, mechanical design application 100 includes an end user interface 102, a design engine 104, and a design database 106. The design engine 104 includes, in particular, a cutout determination engine 108, in accordance with the invention. Together, the elements cooperate to generate and display cutout features of a 3-D solid geometry piece for a user with reduced complexity and improved usability, in accordance with the invention.

In FIG. 1, the end user interface 102 operates to graphically display and receive input, from a user, of a 3-D solid geometry piece under the control of the design engine 104. Under the control of the design engine 104, the design database 106 operates to store 3-D solid geometry piece information for generating and displaying cutout features in the 3-D solid geometry piece. In particular, the cutout determination engine 108 utilizes various inputs to automatically generate and display cutout features. Except for the teachings of the present invention incorporated in the cutout determination engine 108, the mechanical design application 100 is intended to represent a broad range of CAD software known in the art, including but not limited to Autodesk Inventor™, available from Autodesk, Inc. of San Rafael, Calif.

Figure 2:
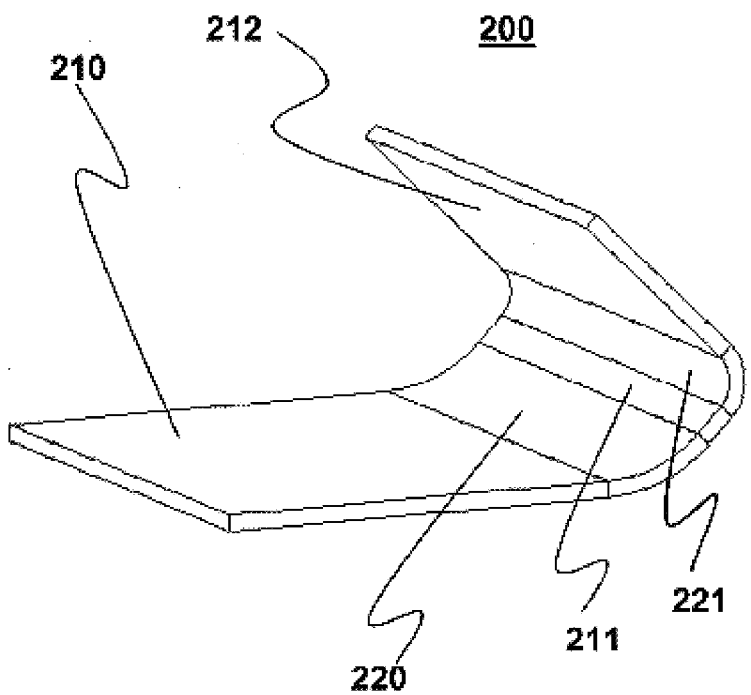
FIG. 2 illustrates a 3-D solid geometry piece upon which one embodiment of the present invention may be practiced; to FIG. 3 illustrates setting up a sketch for a cutout feature, where the cutout feature does not cut through varying surface areas, in accordance with one embodiment of the present invention.

FIG. 2 illustrates a 3-D solid geometry piece upon which one embodiment of the present invention may be practiced. Shown in FIG. 2, the model may be a plate 200. The plate 200 shown in FIG. 2 may be described as horizontal in shape with varying surface areas. The plate 200 has a first flat surface area 210, a first bend surface area 220 to which the first flat surface area 210 is tangentially positioned, a second flat surface area 211 tangent to the first bend surface area 220, a second bend surface area 221 to which the second flat surface area 211 is tangentially positioned, and a third flat surface area 212 tangent to the second bend surface area 221. In particular, the first bend surface area 220 is a gradual bend (i.e., a large bend radius) as compared to the second bend surface area 221, which is a sharper bend (i.e., a small bend radius). It should be appreciated by those skilled in the art that the number of bend surface areas 220–221 and the number of flat surface areas 210–212 are shown to illustrate one example of varying surface areas; however, the number of bend surface areas 220–221 and flat surface areas 210–212 may vary depending upon the complexity of the 3-D solid geometry piece.

Figure 3:
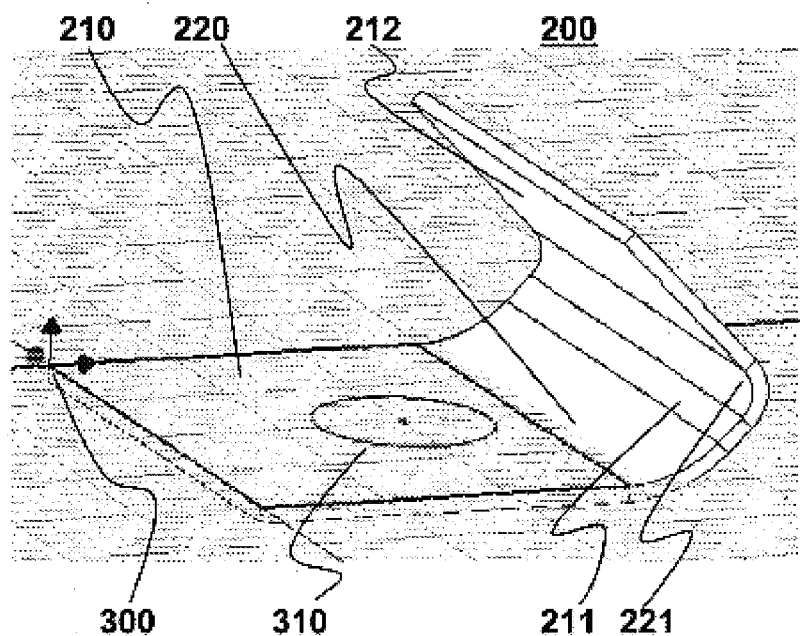

FIG. 3 illustrates setting up a sketch for a cutout feature, where the cutout feature does not cut through varying surface areas, in accordance with one embodiment of the present invention. Shown in FIG. 3 is the plate 200 with its varying surface areas, bend surface areas 220–221 and flat surface areas 210–212. In FIG. 3, a user (not shown) has selected the first flat surface area 210 as a sketch plane 300, upon which, the user may sketch a two-dimensional (2-D) geometry piece of the shape of the cutout feature. As shown in FIG. 3, the user has sketched a circle 310 as the 2-D geometry piece.

The circle 310 is on the sketch plane 300, and starts and ends in the first flat surface area 210. The circle 310 is representative of the shape of a cutout hole (shown as ref. 610 in FIG. 6A), through the plate 200 at a desired location. The circle is utilized to visualize a cutout hole through the plate 200.

Figure 4:
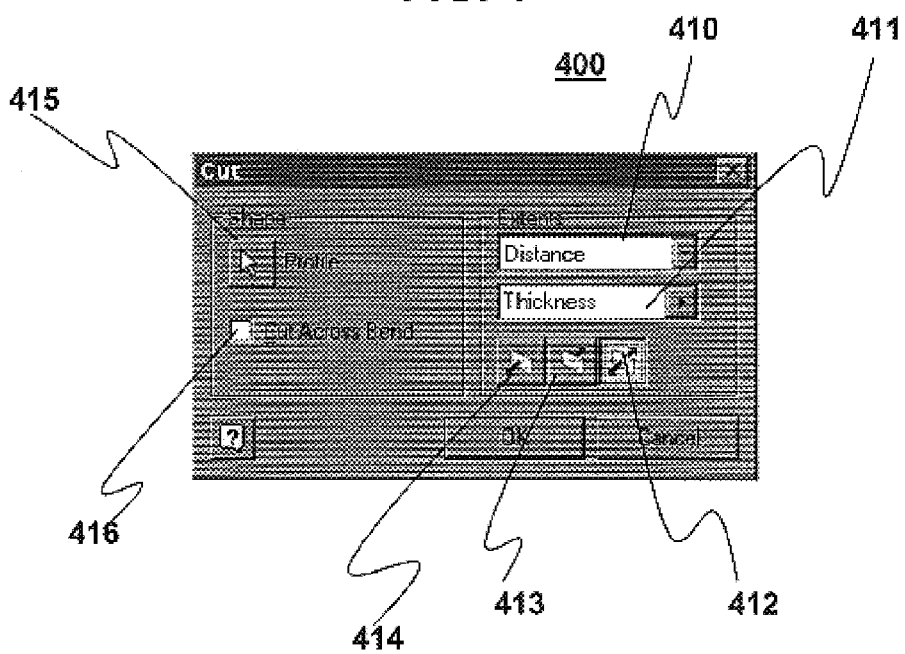
FIG. 4 illustrates an exemplary user interface for setting up the cutout features of 3-D solid geometry pieces, in accordance with one embodiment of the present invention n.

FIG. 4 illustrates an exemplary user interface for setting up the cutout features of 3-D solid geometry pieces, in accordance with one embodiment of the present invention. Shown in FIG. 4 is a cut menu 400 having various inputs fields/icons 410–416. The cut menu 400 is automatically generated and displayed upon receiving an indication of a selection of a cut operation by the user (e.g. by way of a drop down or a pop up menu). Once the cut menu 400 is generated and displayed, the user may select the 2-D geometry piece, the circle 310, to indicate the 2-D geometry piece with which to cut the plate 200. The various inputs entered via fields/icons 410–416 facilitate specifying various aspects of temporary geometry pieces representative of a 3-D geometry piece corresponding to the cutout feature (specified using the 2-D geometry piece) to be applied to the plate 200. As will be described in further detail below, temporary geometry pieces representative of a 3-D geometry piece corresponding to the cutout feature (specified using the 2-D geometry piece) are utilized to aid a user in visualizing the 3-D solid geometry piece representative of the cutout feature that will be subtracted from plate 200 to generate the cutout hole in plate 200.

The various inputs entered via fields/icons 410–416 may correspond to aspects, such as, but not limited to, the extents of the representation of the corresponding 3-D geometry piece of the cutout feature (specified by the 2-D geometry piece), fields/icons 410–414, the shape of the corresponding 3-D geometry piece of the cutout feature (specified by the 2-D geometry piece), fields/icons 415 & 416, and so forth. As shown in FIG. 4, the inputs selected are distance, field 410, thickness, field 411, and both directions of the sketch plane, icon 412.

Figure 5B:
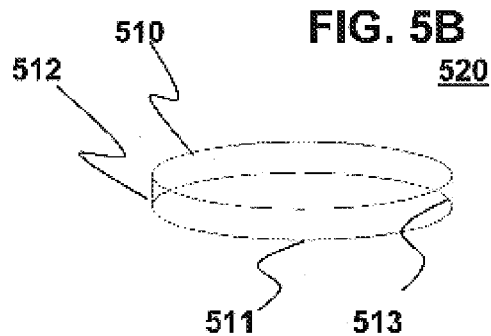
FIGS. 5A–5B illustrate automatic generation of a number of temporary geometry pieces representative of a corresponding 3-D geometry piece of a cutout feature.
Figure 5A:
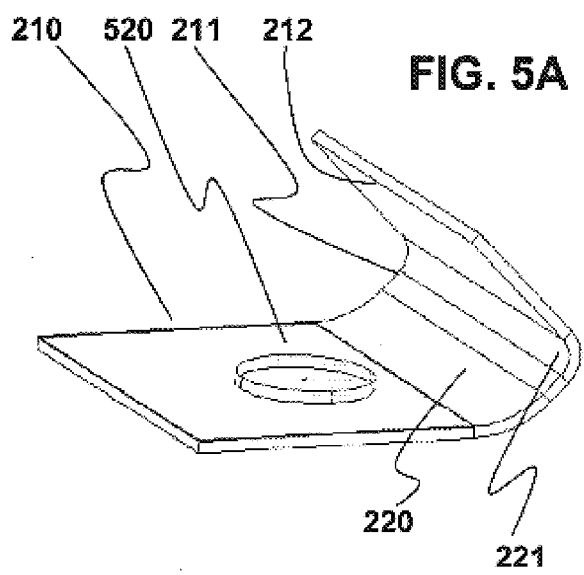

FIGS. 5A–5B illustrate automatic generation of a number of temporary geometry pieces representative of a corresponding 3-D geometry piece of a cutout feature. Referring now to FIG. 5A, the various selected inputs of fields/icons 410–412 in the cut menu 400 (shown in FIG. 4) result in the automatic generation of a number of temporary geometry pieces (shown as refs. 510–513 in FIG. 5B) representative of a corresponding 3-D geometry piece of the cutout feature 520 (specified using the 2-D geometry piece). As shown in FIG. 5B (a detailed view of the cutout feature 520) the 2-D geometry piece, the circle 310, is utilized to generate a temporary geometry piece disposed in a plane offset from the sketch plane in a first direction 510 and a temporary geometry piece disposed in another plane offset from the sketch plane in a second direction 511 (i.e., corresponding to the input of both directions of the sketch plane, selection of icon 412). The temporary geometry pieces disposed in the planes offset from the sketch plane in the first and second directions 510 & 511 are separated by the specified thickness 411 (i.e., the thickness of the plate 200).

Additionally, a first tangent temporary geometry piece 512 and a second tangent temporary geometry piece 513 are generated to denote silhouettes (i.e., providing the 3-D affect of the geometry pieces) between the geometry pieces in both directions 510 & 511. Together, the temporary geometry pieces 510–513 are representative of the 3-D geometry piece corresponding to the cutout feature 520 (specified using the 2-D geometry piece). However, the 3-D geometry piece corresponding to the cutout feature 520 does not take into account the varying surface areas (i.e., the combination of the bend surface areas 220–221 and flat surface areas 210–212) but instead, merely disposed on the "extended" sketch plane 300.

Figure 6A:
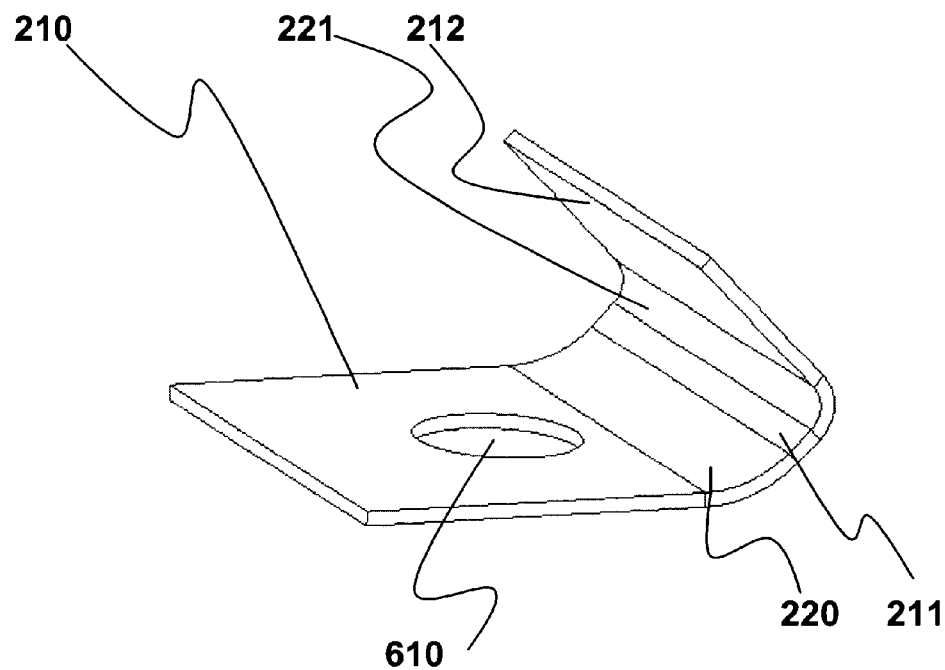
FIGS. 6A & 6B illustrate alternate views of a cut operation with a 3-D solid geometry piece of a cutout feature that does not take into account varying surface areas in the location of the cut.
Figure 6B:
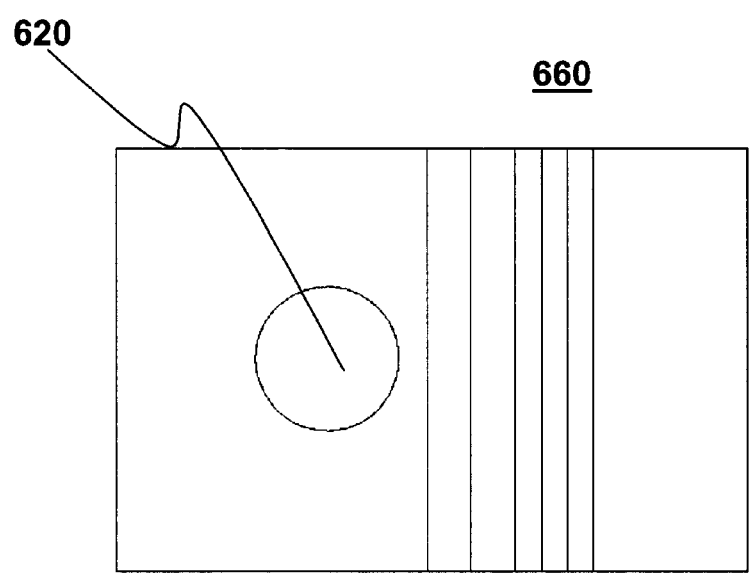

FIGS. 6A & 6B illustrate alternate views of a cut operation with a 3-D solid geometry piece of a cutout feature that does not take into account varying surface areas in the location of the cut. As shown in FIG. 6A, a cutout hole 610 is generated utilizing the number of geometry pieces representative of the 3-D geometry piece of the cutout feature 520 (shown in FIG. 5).

Referring now to FIG. 6B, a cutout hole 620 is shown in a flattened plate 660 with the varying surface areas 220–221 and 210–212 removed.

Referring briefly back to FIG. 5, as will be described in more detail below, in a preferred embodiment, the temporary geometry pieces 510–513 representative of the 3-D geometry piece corresponding to the cutout feature 520 form a wire-frame and not a 3-D solid geometry piece. However, if the user accepts the 3-D wire frame model of the 3-D geometry piece corresponding to the cutout feature 520, the cutout determination engine 108 proceeds to complete the cut operation. As will be explained in more detail below, completing the cut operation includes generation of the 3-D solid geometry piece, and subtracting the 3-D solid geometry piece from the plate 200.

In FIG. 5, a top face is generated with its boundary as the temporary geometry piece disposed in the plane offset in the first direction 510. A bottom face is generated with its boundary as the temporary geometry piece disposed in the plane offset in the second direction 511. The two faces form two discs, with a gap disposed between the discs (i.e., the thickness of the plate). The "gap" in turn is used to form another face, disposed along the circumference of the discs, enclosing the space between the two discs. These faces, defined by the temporary geometry pieces 510 & 511, have face normals associated with them (i.e., an inside and an outside). Once the faces are generated, the cutout determination engine 108 causes other functional blocks (not shown) of design engine 104 to sew the faces into a 3-D solid geometry piece corresponding to the cutout feature. The 3-D solid geometry piece corresponding to the cutout feature is a model that has solid properties. The 3-D solid geometry piece is then utilized by the cutout determination engine 108 to perform the subtraction operation against plate 200 to realize the cutout feature from the plate 200.

Figure 7A:
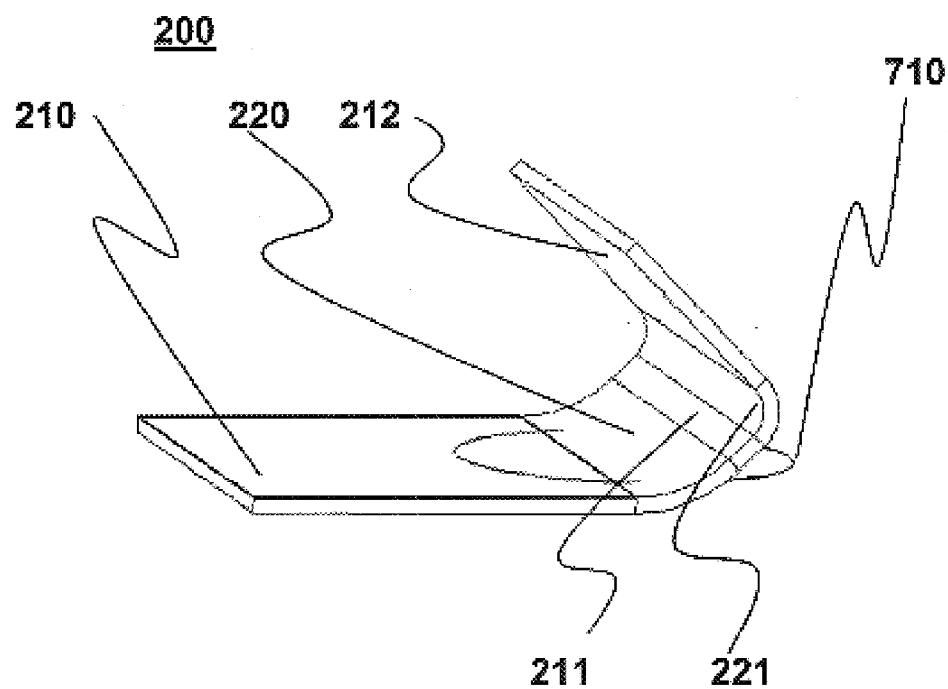
FIGS. 7A–7D illustrate an example of a cutout feature, where the cutout feature cuts through varying surface areas, in accordance with one embodiment of the present invention.

FIGS. 7A–7D illustrate an example of a cutout feature, where the cutout feature cuts through varying surface areas, in accordance with one embodiment of the present invention. However, for better illustrating the advantages of the present invention, FIGS. 7A–7D shows how a cutout hole will be generated if the varying surface areas are not taken into account. Shown in FIG. 7A is the plate 200 with its varying surface areas, bend surface areas 220–221 and flat surface areas 210–212 (as shown in FIG. 2). In FIG. 7A, the user (not shown) continues to use the first flat surface area 210 as a sketch plane 300 (shown in FIG. 3), upon which, the user may modify the sketch 310 (also shown in FIG. 3) or sketch a new 2-D geometry piece of the shape of the cutout feature. As shown in FIG. 7A, a circle 710 extends into the varying surface areas 220–221 & 210–212, as the 2-D geometry piece.

The circle 710 is on the sketch plane 300 (shown in FIG. 3), and starts in the first flat surface area 210 extending beyond the other varying surface areas 212 & 220–221. The circle 710 is representative of the shape of a cutout hole (shown as ref. 1020 in FIG. 10B), through the plate 200 at a desired location, before having the variations in the surface areas 220–221 & 210–212 (i.e., before the bend areas). The circle 710 is utilized to visualize a cutout hole through the plate 200.

Figure 7B:
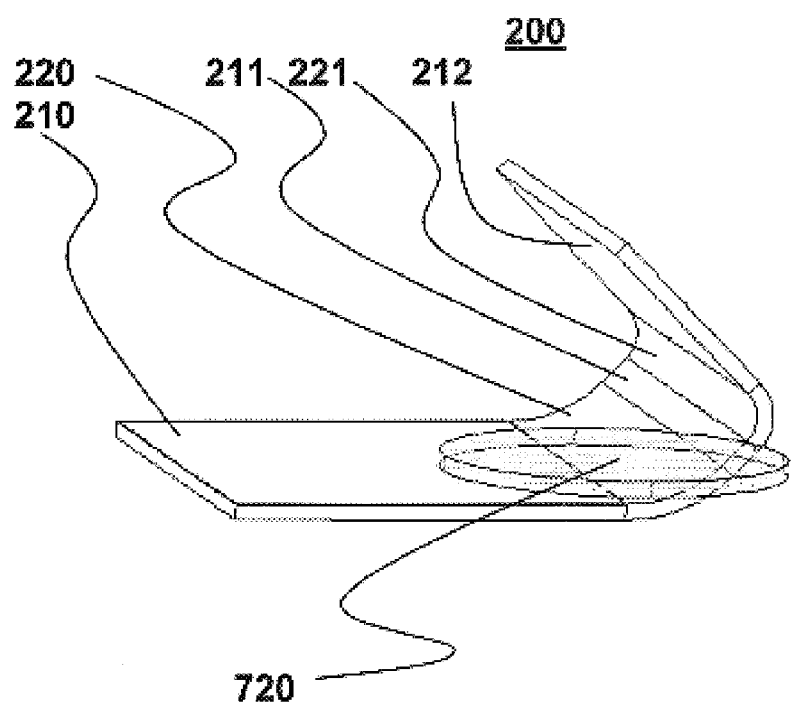

Referring now to FIG. 7B, the various selected inputs entered via fields/icons 410–412 in the cut menu 400 (shown in FIG. 4) results in a number of geometry pieces representative of a 3-D geometry piece of a cutout feature 720 (specified using the 2-D geometry piece). As previously described, the 3-D cutout feature 720 forms a wire frame model of the 3-D geometry piece corresponding to the cutout feature 720.

As described above, if the user accepts the 3-D wire frame model of the 3-D geometry piece corresponding to the cutout feature 720, the cutout determination engine 108 proceeds to complete the cut operation. The complete cut operation results in a cutout hole 730 (shown in FIG. 7C).

Figure 7C:
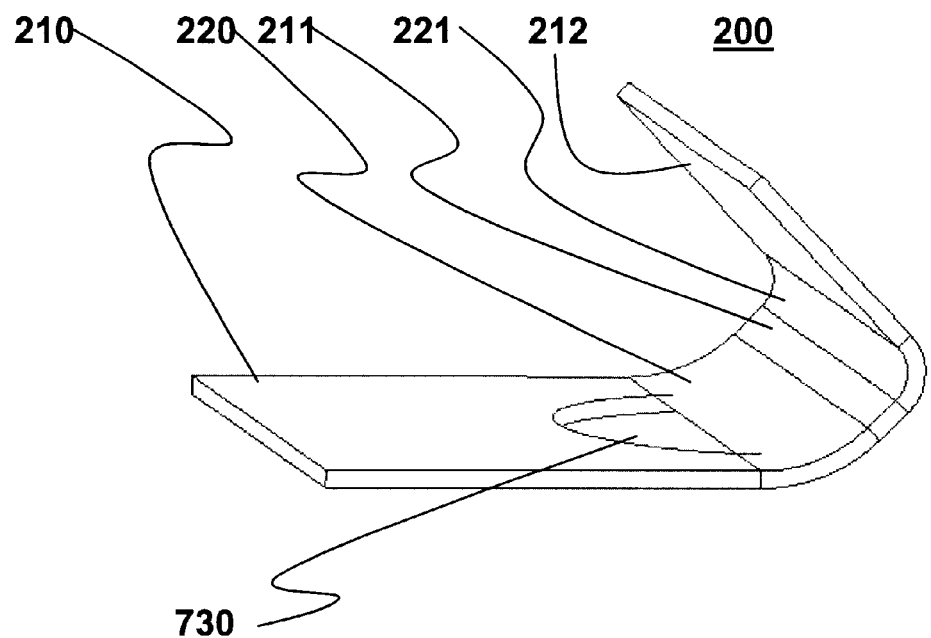

However, as shown in FIG. 7C, the cutout hole 730 is not representative of a shape of a cut through the plate 200 at the desired location, before having the variations in the surf ace areas 220–221 and 210–212 (i.e., before the bend areas).

Figure 7D:
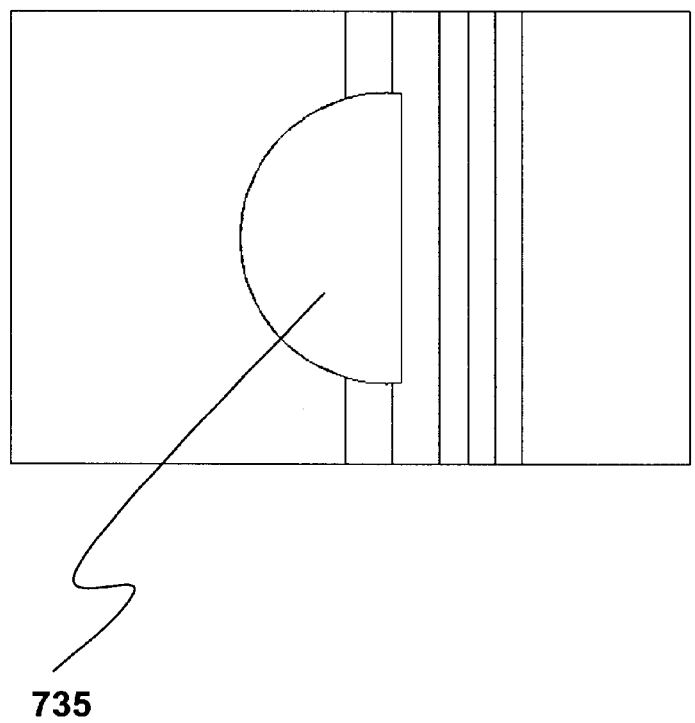

Referring now to FIG. 7D, a flattened cutout hole 735 represents a cutout hole, before the varying surface areas 210–212, 220 & 221 were present in the plate 200 (ie., as if the cut feature was cut into the plate 200 before the bending, a flat plate 760). Because of not taking into account for the varying surface areas 220–221 and 210–212, the cutout hole 735 shown.,in the flattened plate 760 with the varying surface areas 220–221 and 210–212 removed, only partially cuts through the plate 200.

Figure 8:
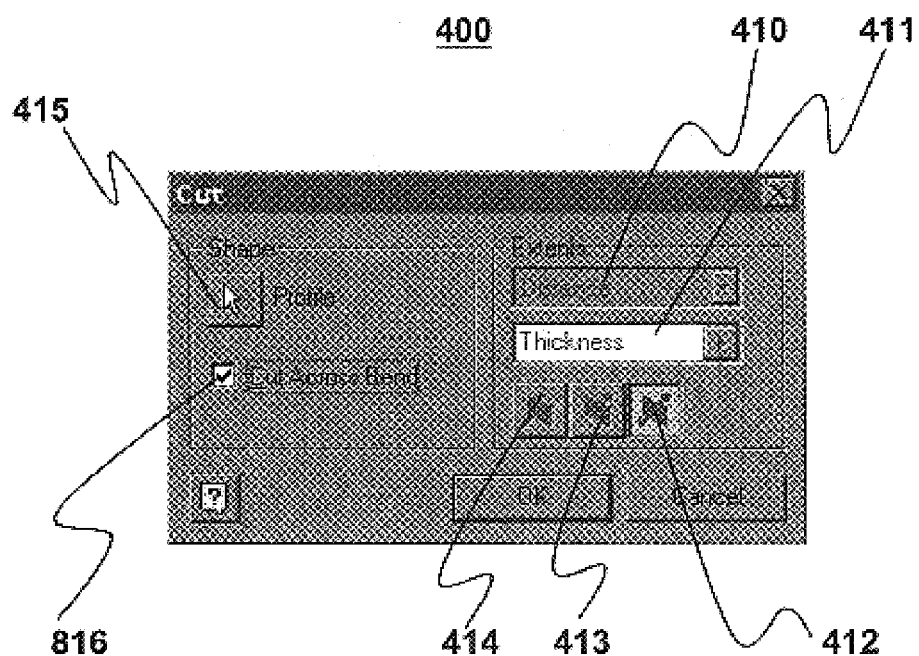
FIG. 8 illustrates a user having selected an input in a cut menu via fields/icons to generate temporary geometry pieces representative of a 3-D geometry piece of a cutout feature that takes into account varying surface areas of a 3-D solid geometry piece, in accordance with one embodiment of the present invention.

FIG. 8 illustrates a user having selected an input in a cut menu via fields/icons to generate temporary geometry pieces representative of a 3-D geometry piece of a cutout feature that takes into account varying surface areas of a 3-D solid geometry piece, in accordance with one embodiment of the present invention. As shown in FIG. 8, the user has selected to check the Cut Across Bend field 816 in the cut menu 400 (shown in FIG. 4). As shown, once the user has selected the Cut Across Bend field 816, the other fields/icons 410–414 are changed to un-selectable (i.e., grayed-out).

As will be described in further detail below, if the cutout determination engine 108 receives the Cut Across Bend selection via the Cut Across Bend field 816, the cutout determination engine 108 automatically determines if a 2-D geometry piece cuts through a bend area. Once the cutout determination engine 108 determines that the two-dimensional geometry piece cuts through a bend area, the cutout determination engine 108 automatically generates a number of temporary geometry pieces representative of a 3-D geometry piece of a cutout feature through the bend area in the 3-D solid geometry piece. Additionally, the cutout determination engine 108 automatically generates a number of temporary geometry pieces representative of a 3-D geometry piece of a cutout feature through any number of varying surface areas.

The cutout determination engine 108 automatically sets an extents to be a thickness of the 3-D solid geometry piece to be cut, starting from a sketch plane of the 2-D geometry piece of the shape of the cutout feature for cutting and ending at the thickness distance in a direction opposite a normal direction of the sketch plane (as shown as ref. 300 in FIG. 3).

Figure 9:
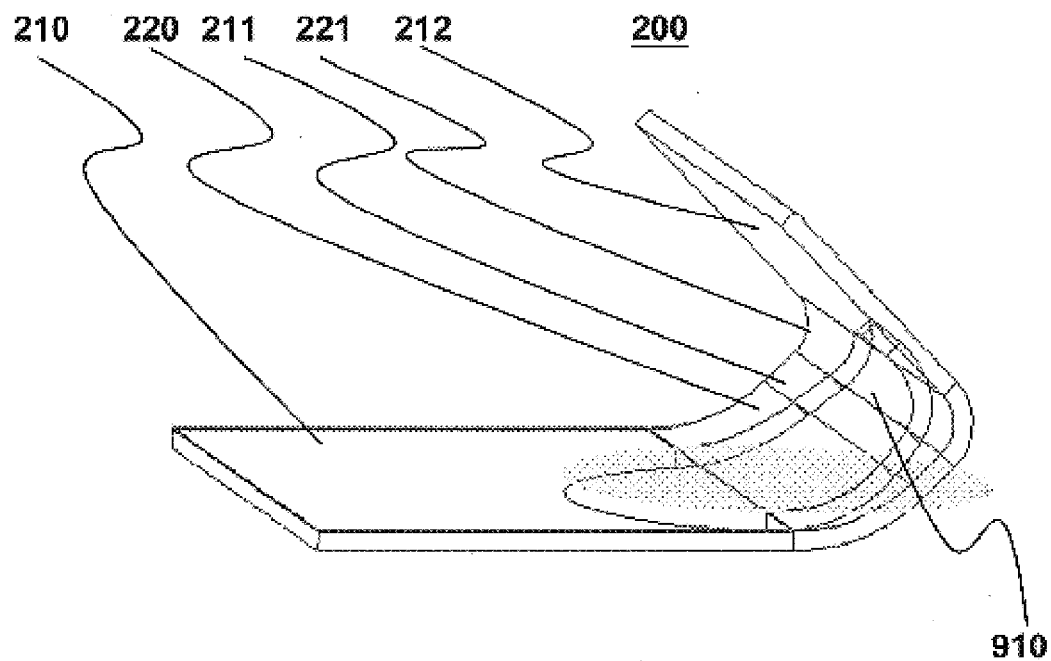
FIG. 9 illustrates automatically generating a number of geometry pieces representative of a 3-D geometry piece of a cutout feature cutting through a bend area in a 3-D solid geometry piece, in accordance with one embodiment of the present invention.

FIG. 9 illustrates automatically generating a number of geometry pieces representative of a 3-D geometry piece of a cutout feature cutting through a bend area in a 3-D solid geometry piece, in accordance with one embodiment of the present invention. Shown in FIG. 9, the cutout determination engine 108 determines that the 2-D geometry piece of the shape of the cutout feature, the circle 710, cuts through more than one bend area, the first bend area 220 and the second bend area 221. The circle 710 cuts through the first flat area 210, the second flat area 211, and the third flat area 212 because of its size.

In FIG. 9, once it is determined that the circle 710 cuts through the bend areas 220 & 221, the cutout determination engine 108 automatically generates a number of temporary geometry pieces representative of a 3-D geometry piece of a cutout feature 910 through the bend areas 220 & 221, including the flat areas 210–212. As shown in FIG. 9, the temporary geometry pieces representative of the 3-D geometry piece of a cutout feature 910 matches the varying surface areas 210–212,–220 & 221. As referred to earlier, the number of temporary geometry pieces representative of the 3-D geometry piece of the cutout feature 910 forms a wire-frame and not a 3-D solid geometry piece.

As a result, a user may visualize a preview of a complex cutout through varying surface areas before making a decision to cut through a 3-D solid geometry piece. Additionally, because the number of temporary geometry pieces is representative of a 3-D geometry piece of a cutout feature, if the user is not satisfied with the preview, the user need only cancel the operation without performing any further operation.

If the user is satisfied with preview, the user may select to complete the cut operation whereby the selection to complete the cut operation is received by the cutout determination engine 108. As previously described, in order to complete the cut operation, the cutout determination engine 108 causes other functional blocks of design engine 104 to generate faces utilizing the number of geometry pieces representative of the 3-D geometry piece of the cutout feature 910. The generated faces are sewn to form a 3-D solid geometry piece of the cutout feature. A subtraction operation is performed between the plate 200 and the 3-D solid geometry piece of the cutout feature 910, thereby generating a cutout hole (shown as ref. 1010 in FIG. 10A) in the plate 200.

Figure 10A:
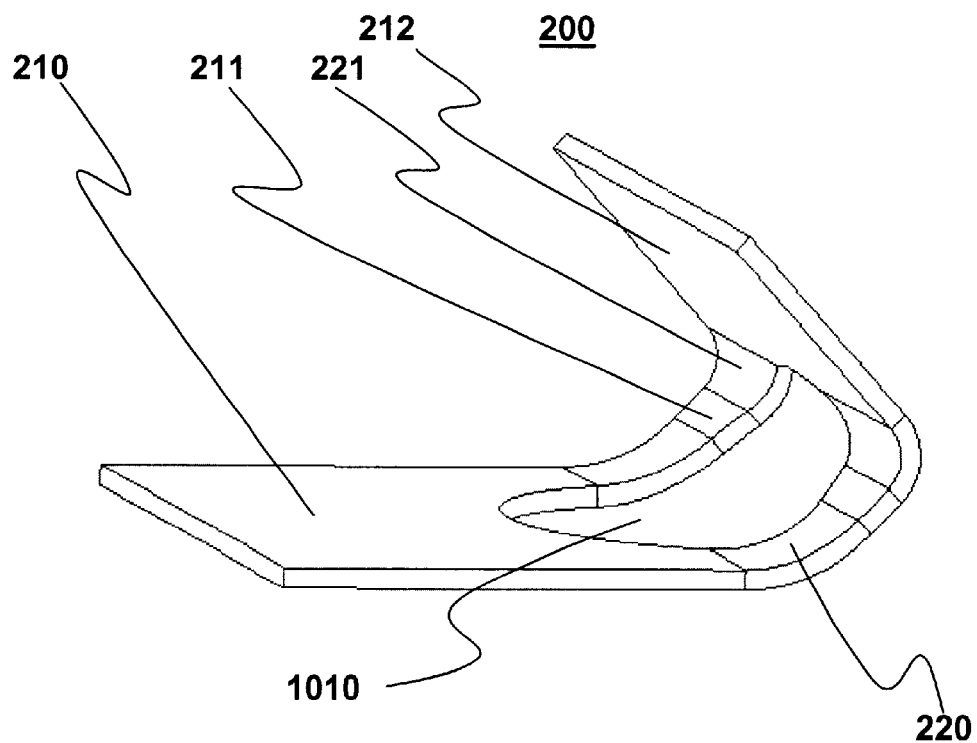
FIGS. 10A & B illustrate alternate views of a 3-D solid geometry piece with a cutout hole through a bend area, in accordance with one embodiment of the present invention.
Figure 10B:
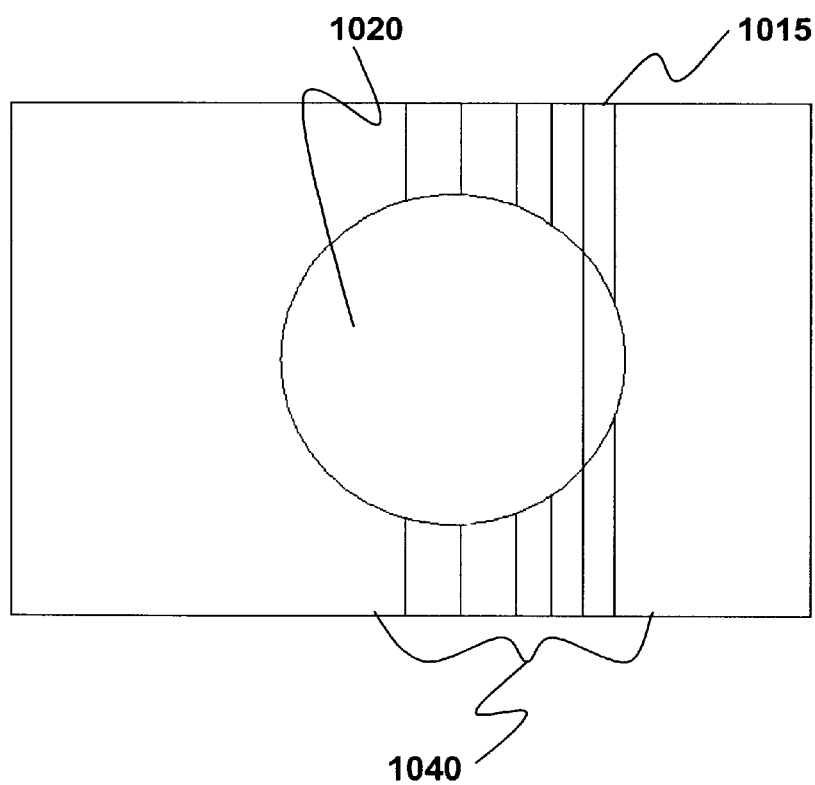

FIGS. 10A & B illustrate alternate views of a 3-D solid geometry piece with a cutout hole through a bend area, in accordance with one embodiment of the present invention. Shown in FIG. 10A, the plate 200 has a cutout hole 1010 because of the subtraction operation, as described above. As shown, the cutout hole 1010 takes into account the varying surface areas 210–212 & 220–221. The cutout hole 1010 represents a cutout hole before the varying surface areas 210–212 & 220–221 were present in the plate 200 (i.e., as if the cut feature was cut into the plate 200 before the bending).

Referring now to FIG. 9B, if the varying surface areas 210–212 & 220–221 of the plate 200 with the cutout hole 910 were removed (i.e., flattened out), a flat plate view 1015 would show a circular cutout hole 1020 in the location of the removed varying surface areas 1040.

As a result, cutout features through varying surface areas may be simply generated and visualized.

Figure 11A:
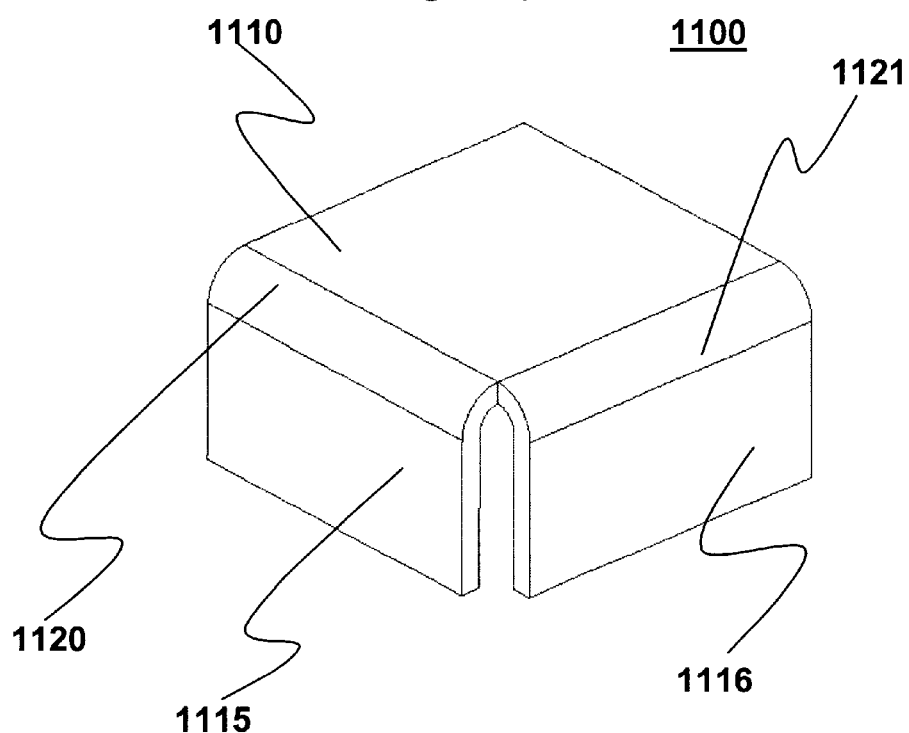

FIGS. 11A–11E illustrate an alternate 3-D solid geometry piece upon which one embodiment of the present invention may be practiced. As shown in FIG. 11A, an alternate 3-D solid geometry piece 1100 has a horizontal rectangular flat top surface area 1110, a first vertical flange surface area 1115 along a first side of the rectangular flat top surface area 1110, and a second vertical flange surface area 1116 along a second side of the rectangular flat top area 1110. The first vertical flange surface area 1115 and the second vertical flange surface area 1116 are 90 degrees to each other. Shown in FIG. 11A, the first vertical flange surface area 1115 is joined along the first side of the horizontal rectangular flat surface area 1110 by a first vertical flange bend surface area 1120. The second vertical flange surface area 1116 is joined along the second side of the horizontal rectangular flat surface area 110 by a second vertical flange bend surface area 1121.

Figure 11B:
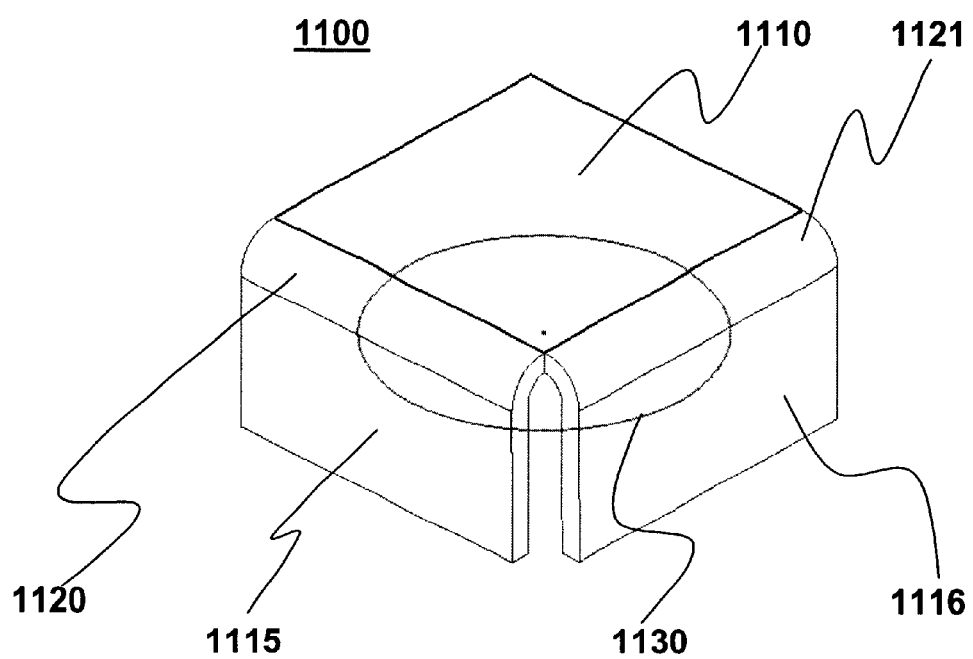

Shown in FIG. 11B, a 2-D geometry piece, a corner cut circle 1130 is sketched on the horizontal rectangular flat top surface area 1110 (i.e., the horizontal rectangular flat top surface area 1110 is utilized as a sketch plane). As shown in FIG. 11B, the corner cut circle 1130 is larger than the alternate 3-D solid geometry piece 1100. However, as previously described, a cutout hole through the alternate 3-D solid geometry piece 1100 takes into account the flange bend surface areas 1120 & 1121 including the flange surface areas 1115 & 1116, in accordance with one embodiment of the present invention.

Referring now to FIG. 11C, temporary geometry pieces representative of a 3-D geometry piece corresponding to a cutout feature 1140 (specified using the 2-D geometry piece) are utilized to aid a user in visualizing the 3-D solid geometry piece representative of the cutout feature 1140. The cutout feature 1140 will be subtracted from the alternate 3-D solid geometry piece 1100 to generate the cutout hole in the alternate 3-D solid geometry piece 1100. As previously described, a user may visualize a preview of a complex cutout through varying surface areas before making a decision to cut through a 3-D solid geometry piece.

Satisfied with the preview, the user may select to complete the cut operation whereby the selection to complete the cut operation is received by the cutout determination engine 108. As previously described, in order to complete the cut operation, the cutout determination engine 108 causes other functional blocks of design engine 104 to generate faces utilizing the number of geometry pieces representative of the 3-D geometry piece of the cutout feature 1140. The generated faces are sewn to form a 3-D solid geometry piece of the cutout feature. A subtraction operation is performed between the alternate 3-D solid geometry piece 1100 and the 3-D solid geometry piece of the cutout feature 1140, thereby generating a cutout hole 1145 shown in FIG. 11D.

Referring now to FIG. 11E, if the bend surface areas 1115 & 1116 of the alternate 3-D solid geometry piece 1100 with the cutout hole 1145 were removed (i.e., flattened out), a flat plate view 1150 would show a circular corner cutout hole 1160 in the location of the corner location.

As a result, corners with bends may also be previewed and properly cut, in accordance with the present invention.

Figure 12:
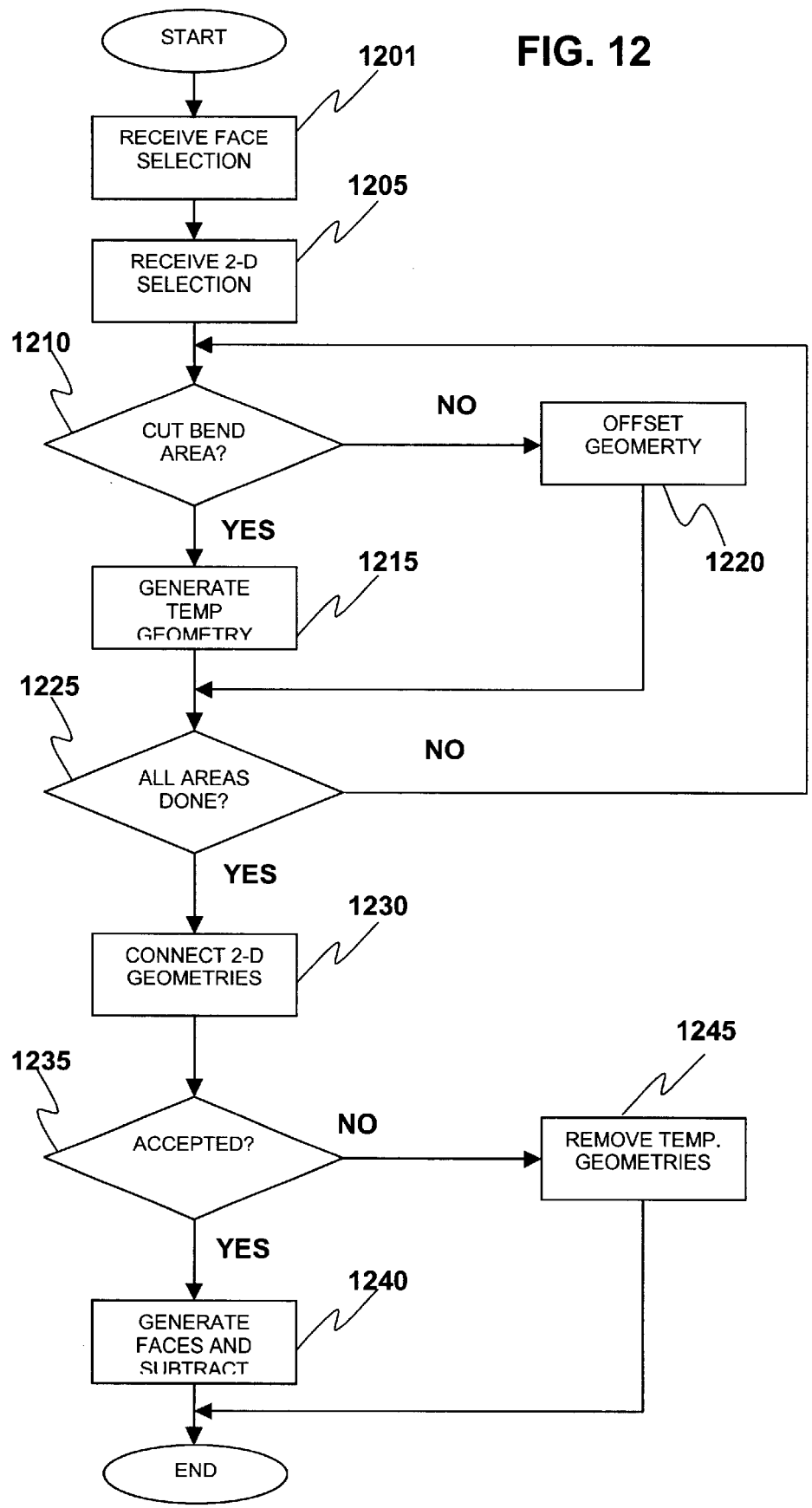
FIG. 12 illustrates the relevant operational flows of one embodiment of the cutout determination engine 108 of FIG. 1.

FIG. 12 illustrates the relevant operational flows of one embodiment of the cutout determination engine 108 of FIG. 1. For the illustrated embodiment, cutout determination engine 108 is programmed in an event driven model (i.e., cutout determination engine 108 is designed to be executed in a system environment where various event notification services are available from the operating system). One example of such an operating system suitable for practicing the invention is the Windows® operating system, available from Microsoft-Corporation of Redmond, Wash. In alternate embodiments, cutout determination engine 108 may be implemented in other programming approaches known in the art.

As shown in FIG. 12, the cutout determination engine 108 receives a selection of a face of a 3-D solid geometry piece as a sketch plane 1201. In particular, the 3-D solid geometry piece has a bend area. A selection of a 2-D geometry piece for cutting through the 3-D solid geometry piece is received 1205. The 2-D geometry piece is a 2-D geometry piece of the shape of a cutout feature on the selected sketch plane.

In response to the selection of the 2-D geometry piece on the selected sketch plane for cutting through the 3-D solid geometry piece, the cutout determination engine 108 determines the type of faces the 2-D geometry piece cuts through, such as the bend area 1210.

If it is determined that the 2-D geometry piece does cut through the bend area, the cutout determination engine 108 automatically generates a number of temporary geometry pieces representative of a 3-D geometry piece of a cutout feature through the bend area in the 3-D solid geometry piece 1215.

In one embodiment, the number of temporary geometry pieces is determined by calculating a flat boundary from the bend area and determining a portion of the 2-D geometry piece lying within the flat boundary. Once the portion of the 2-D geometry piece lying within the flat boundary is determined, the portion is divided into a predetermined number of points. The number of points will depend upon the precision with which the user sets the design engine 104 (i.e., the CAD program). The points are transformed onto a cylindrical or conical surface of the bend area, which is a geometric definition of the face of the bend area. The points are offset in a direction opposite the selected sketch plane, along the points' normal vector. The distance of the offset is the thickness of the 3-D solid geometry piece. Finally, these points are connected to become the number of temporary geometry pieces representative of the 3-D geometry piece of the cutout feature through the bend area.

However, if the 2-D geometry piece does not cut through a bend area (i.e., a planar area), the cutout determination engine 108 offsets the 2-D geometry piece in a direction normal to the selected sketch plane 1220. The offset temporary 2-D geometry piece and the original 2-D geometry piece are connected together by temporary geometry pieces, such as, but not limited to, temporary silhouette geometry pieces. The number of temporary geometry pieces, including the connecting temporary two-dimensional geometry pieces, forms a representation of a 3-D geometry piece of a cutout feature through the 3-D solid geometry piece.

The cutout determination engine 108 continues to determine the type of areas the 2-D geometry piece cuts through, until all of the areas are accounted for 1225.

Once all of the areas the 2-D geometry piece cuts through have been determined, the cutout determination engine 108 causes other functional blocks of design engine 104 to connect all of numbers of temporary geometry pieces to form a representation of a 3-D geometry piece of a cutout feature through all of the areas cut through by the 2-D geometry piece 1230.

After generating the number of temporary geometry pieces representative of a 3-D geometry piece of a cutout feature, the cutout determination engine 108 determines if an acceptance of the number of temporary geometry pieces is received 1235. If an acceptance is received, the cutout determination engine 108 causes other functional blocks of design 104 to generate faces utilizing the number of temporary geometry pieces to form a 3-D solid geometry piece of the cutout feature, as described above 1240. The 3-D solid geometry piece of the cutout is utilized to perform a subtraction operation, as described above as well.

However, if an acceptance is not received, which may be a cancel or an undo operation, the cutout determination engine 108 simply removes the number of temporary geometry pieces 1245.

As a result, cutout features through varying surface areas may be simply generated and visualized.

Figure 13:
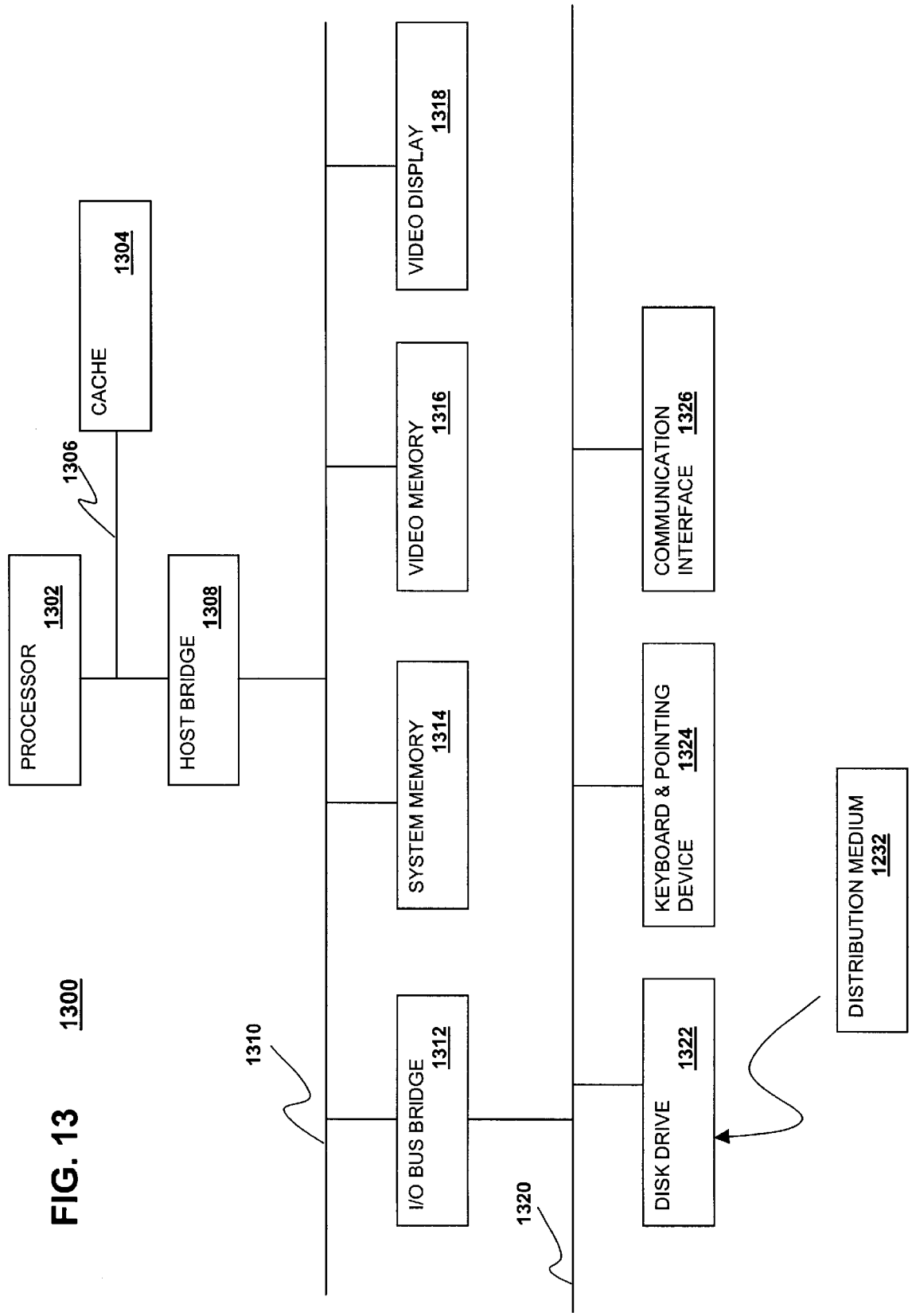
FIG. 13 illustrates one embodiment of a computer system suitable to be programmed with the mechanical design application of the invention.

FIG. 13 illustrates one embodiment of a computer system suitable to be programmed with the mechanical design application of the invention. As shown, for the illustrated embodiment, computer 1300 includes processor 1302, processor bus 1306, high performance I/O bus 1310 and standard I/O bus 1320. Processor bus 1306, and high performance I/O bus 1310 are bridged by host bridge 1308, whereas I/O buses 1310 and 1320 are bridged by I/O bus bridge 1312. Coupled to processor bus 1306 is cache 1304. Coupled to high performance I/O bus 1310 are system memory 1314 and video memory 1316, against which video display 1318 is coupled. Coupled to standard I/O bus 1320 are disk drive 1322, keyboard and pointing device 1324, and communication interface 1326.

These elements perform their conventional functions known in the art. In particular, disk drive 1322 and system memory 1314 are used to store permanent and working copies of the mechanical design system incorporated with the teachings of the invention. The permanent copy may be pre-loaded into disk drive 1322 in factory, loaded from distribution medium 1332, or down loaded from a remote distribution source (not shown). Distribution medium 1332 may be a tape, a CD, and DVD or other storage medium of the like. The constitutions of these elements are known. Any one of a number implementations of these elements known in the art may be used to form computer system 1300.

In general, those skilled in the art will recognize that the invention is not limited by the details described, instead, the invention can be practiced with modifications and alterations within the spirit and scope of the appended claims. The description is thus to be regarded as illustrative instead of restrictive on the invention.

Thus, an improved way of generating and visualizing cutout features of a computer aided design (CAD) models with varying surface areas is disclosed.

What is claimed is:

1. In a computer aided design (CAD) environment, a method comprising:
   receiving a selection of a face of a first three-dimensional solid geometry piece, the first three-dimensional solid geometry piece having a bend area,
   receiving a depiction of a two-dimensional geometry piece on said face for specifying a cutout feature cutting through the first three-dimensional solid geometry piece;
   determining whether the cutout feature as specified through said depiction of the two-dimensional geometry piece cuts through the bend area; and
   automatically generating a plurality of temporary geometry pieces representative of a three-dimensional geometry piece corresponding to the cutout feature cutting through the bend area in the first three-dimensional solid geometry piece.

2. The method of claim 1 further comprising:
   receiving an indication, from a user, of accepting the plurality of temporary geometry pieces representative of the three-dimensional geometry piece corresponding to the cutout feature;
   automatically generating a plurality of faces from the plurality of temporary geometry pieces;
   automatically forming a second three-dimensional solid geometry piece corresponding to the three-dimensional geometry piece corresponding to the cutout feature; and
   automatically performing a subtraction operation of the second three-dimensional solid geometry piece corresponding to the cutout feature from the first three-dimensional solid geometry piece to realize the cutout feature.

3. The method of claim 1, wherein said receiving of a selection of a face comprises receiving a designation of a flat face of the first three-dimensional solid geometry piece as a sketch plane.

4. The method of claim 1, wherein said receiving a selection of a face further comprises receiving a selection of a flat face tangent to the bend area in the first three-dimensional solid geometry piece.

5. The method of claim 1, wherein said determining comprises determining type of faces the two-dimensional geometry piece cuts through.

6. The method of claim 1, wherein said automatically generating comprises determining a portion of the two-dimensional geometry piece included within a boundary based at least upon the selected face of the first three-dimensional solid geometry piece.

7. The method of claim 6 further comprising:
   automatically generating a plurality of points along the portion of the two-dimensional geometry piece included within the boundary;
   transforming the plurality of points onto the face;
   offsetting the plurality of points by a predetermined distance in a direction substantially opposite to a normal vector of the face; and
   connecting the plurality of points to form the plurality of temporary geometry pieces to form the second three-dimensional solid geometry piece corresponding to the cutout feature cutting through the bend area in the first three-dimensional solid geometry piece.

8. An apparatus comprising:
   a storage medium having stored therein a plurality of instructions, wherein when executed, the instructions operate to receive a selection of a face of a first three-dimensional solid geometry piece, the first three-dimensional solid geometry piece having a bend area, receive a depiction of a two-dimensional geometry piece on said face for specifying a cutout feature cutting through the first three-dimensional solid geometry piece, determine whether the cutout feature as specified through said depiction of the two-dimensional geometry piece cuts through the bend area, and automatically generate a plurality of temporary geometry pieces representative of a three-dimensional geometry piece corresponding to the cutout feature cutting through the bend area in the first three-dimensional solid geometry piece;
   a processor coupled to the storage medium to execute the instructions.

9. The apparatus of claim 8, wherein the instructions further operate to receive an indication, from a user, of accepting the plurality of temporary geometry pieces representative of the three-dimensional geometry piece corresponding to the cutout feature, automatically generate a plurality of faces from the plurality of temporary geometry pieces, automatically form a second three-dimensional solid geometry piece corresponding to the three-dimensional geometry piece corresponding to the cutout feature, and automatically perform a subtraction operation of the second three-dimensional solid geometry piece corresponding to the cutout feature from the first three-dimensional solid geometry piece to realize the cutout feature.

10. The apparatus of claim 8, wherein the instructions operate to receive a designation of a flat face of the first three-dimensional solid geometry piece as a sketch plane.

11. The apparatus of claim 8, wherein the instructions operate to receive a selection of a flat face tangent to the bend area in the first three-dimensional solid geometry piece.

12. The apparatus of claim 8, wherein the instructions operate to determine type of faces the two-dimensional geometry piece cuts through.

13. The apparatus of claim 8, wherein the instructions operate to determine a portion of the two-dimensional geometry piece included within a boundary based at least upon the selected face of the first three-dimensional solid geometry piece.

14. The apparatus of claim 13, wherein the instructions further operate to automatically generate a plurality of points along the portion of the two-dimensional geometry piece included within the boundary, transform the plurality of points onto the face, offset the plurality of point by a predetermined distance in a direction substantially opposite to a normal vector of the face, and connect the plurality of points to form the plurality of temporary geometry pieces to form the second three-dimensional solid geometry piece corresponding to the cutout feature cutting through the bend area in the first three-dimensional solid geometry piece.

15. An article accessible medium having stored therein a plurality of instructions, wherein when executed, the instructions operate to receive a selection of a face of a first three-dimensional solid geometry piece, the first three-dimensional solid geometry piece having a bend area, receive a depiction of a two-dimensional geometry piece on said face for specifying a cutout feature cutting through the first three-dimensional solid geometry piece, determine whether the cutout feature as specified through said depiction of the two-dimensional geometry piece cuts through the bend area, and automatically generate a plurality of temporary geometry pieces representative of a three-dimensional geometry piece corresponding to the cutout feature cutting through the bend area in the first three-dimensional solid geometry piece.

16. The article accessible medium of claim 15, wherein the instructions further operate to receive an indication, from a user, of accepting the plurality of temporary geometry pieces representative of the three-dimensional geometry piece corresponding to the cutout feature, automatically generate a plurality of faces from the plurality of temporary geometry pieces, automatically form a second three-dimensional solid geometry piece corresponding to the three-dimensional geometry piece corresponding to the cutout feature, and automatically perform a subtraction operation of the second three-dimensional solid geometry piece corresponding to the cutout feature from the first three-dimensional solid geometry piece to realize the cutout feature.

17. The article accessible medium of claim 15, wherein the instructions operate to receive a designation of a flat face of the first three-dimensional solid geometry piece as a sketch plane.

18. The article accessible medium of claim 15, wherein the instructions operate to receive a selection of a flat face tangent to the bend area in the first three-dimensional solid geometry piece.

19. The article accessible medium of claim 15, wherein the instructions operate to determine type of faces the two-dimensional geometry piece cuts through.

20. The article accessible medium of claim 15, wherein the instructions operate to determine a portion of the two-dimensional geometry piece included within a boundary based at least upon the selected face of the first three-dimensional solid geometry piece.

21. The article accessible medium of claim 20, wherein the instructions further operate to automatically generate a plurality of points along the portion of the two-dimensional geometry piece included within the boundary, transform the plurality of points onto the face, offset the plurality of point by a predetermined distance in a direction substantially opposite to a normal vector of the face, and connect the plurality of points to form the plurality of temporary geometry pieces to form the second three-dimensional solid geometry piece corresponding to the cutout feature cutting through the bend area in the first three-dimensional solid geometry piece.

* * * * *